Dec. 11, 1951  J. SCHAEFER  2,578,266
WHEEL ROTATING DEVICE
Filed Jan. 2, 1948  2 SHEETS—SHEET 1
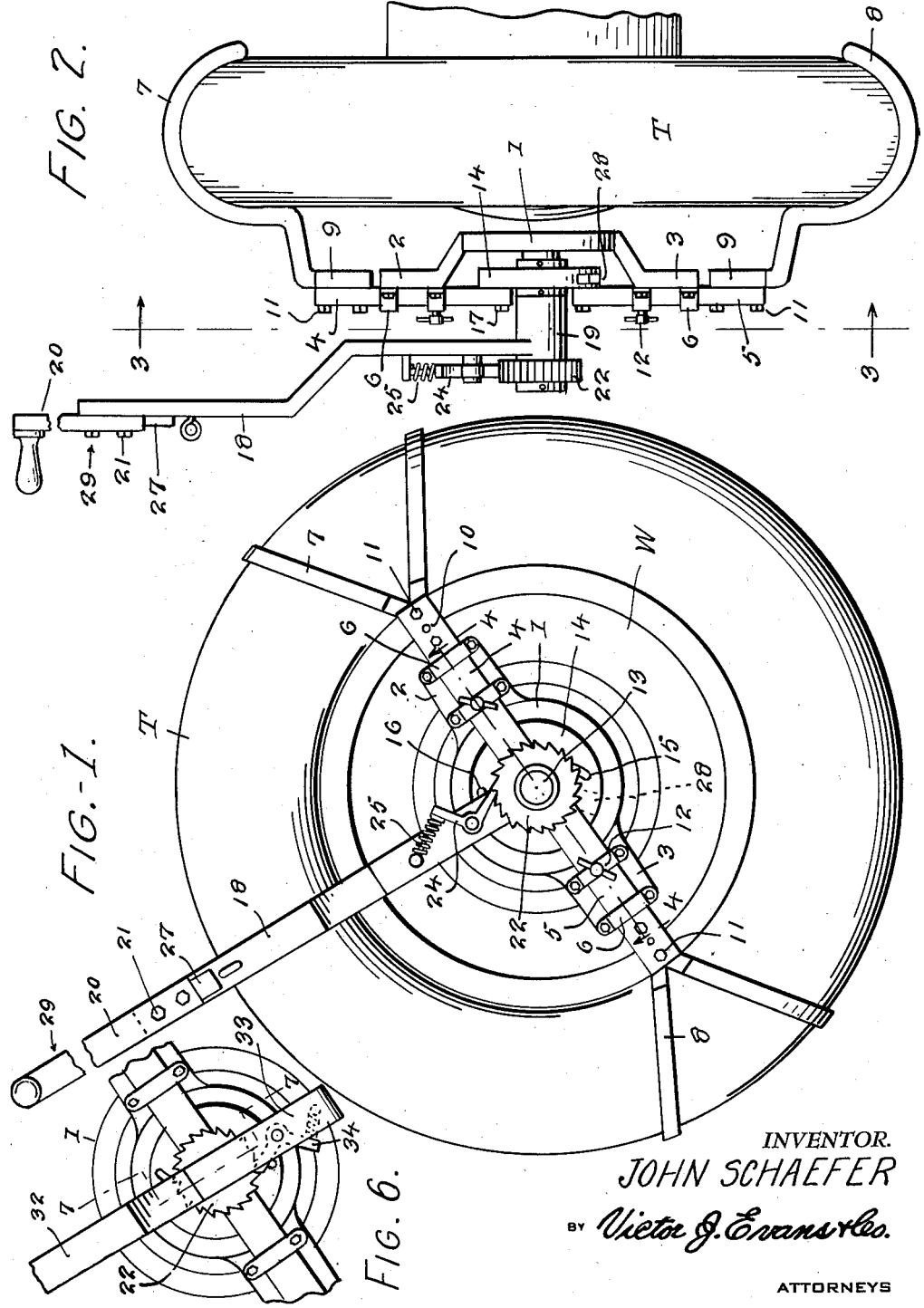
INVENTOR.
JOHN SCHAEFER
BY Victor J. Evans & Co.
ATTORNEYS Dec. 11, 1951  J. SCHAEFER  2,578,266
WHEEL ROTATING DEVICE
Filed Jan. 2, 1948  2 SHEETS—SHEET 2
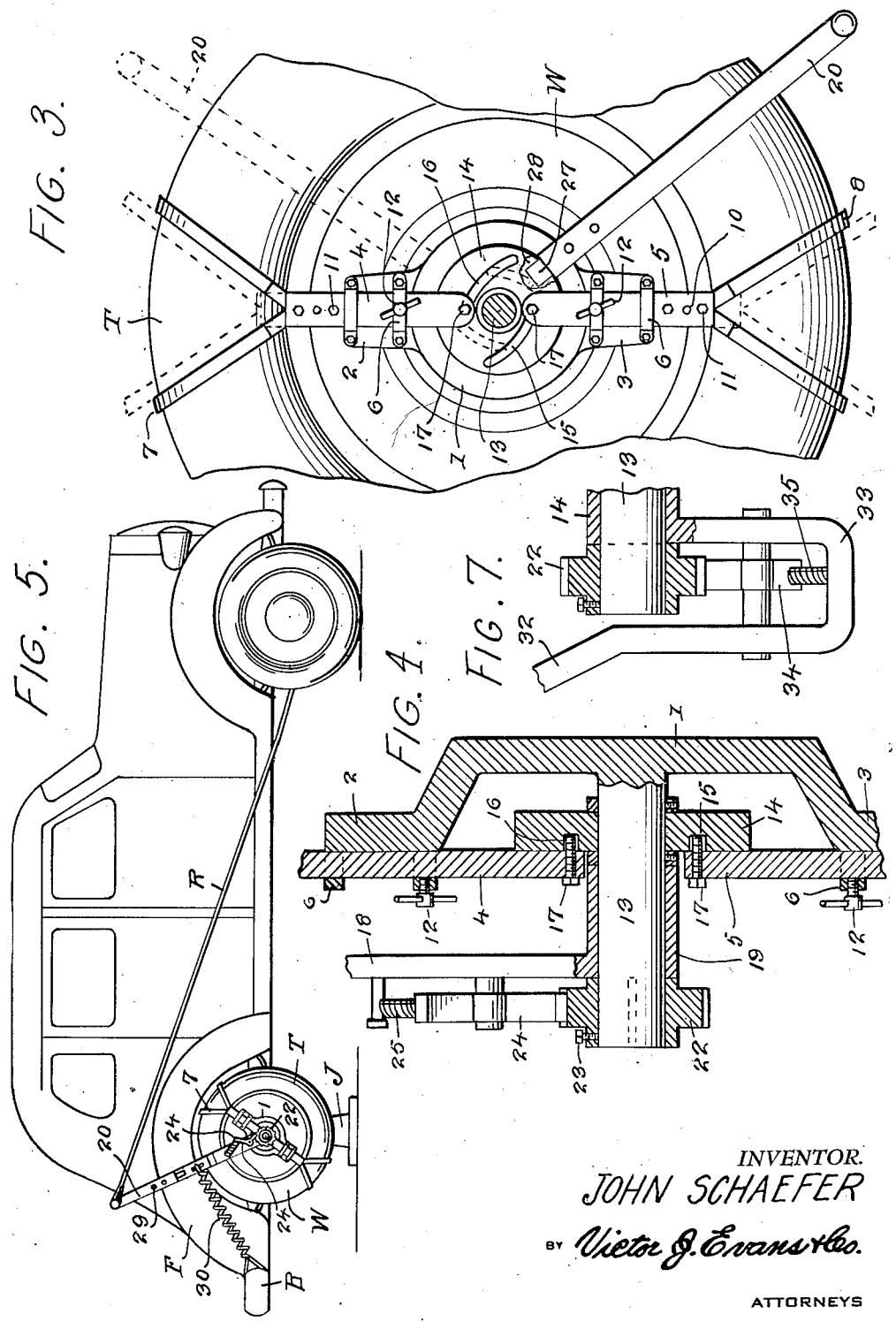
INVENTOR.
JOHN SCHAEFER
BY *Victor J. Evans & Co.*
ATTORNEYS Patented Dec. 11, 1951

2,578,266

UNITED STATES PATENT OFFICE 2,578,266

WHEEL ROTATING DEVICE

John Schaefer, Strum, Wis.

Application January 2, 1948, Serial No. 267

2 Claims. (Cl. 74—142)

My present invention relates to the general class of mechanical starting appliances for internal combustion engines, and more specifically to an improved starter for motors of automotive vehicles, which starter includes manually operated means for attachment to one of the drive wheels of an automobile, truck, or similar vehicle. By means of the attachment the wheel is turned to create motion and power that are transmitted through the transmission mechanism to the motor of the vehicle for energizing the motor.

In the utilization of the appliance of my invention the rear end of the vehicle is jacked up to elevate the drive wheels from a supporting surface, and a manually operated lever mechanism is mounted upon one of the wheels, or its tire, for turning the wheel and starting the motor of the vehicle.

The appliance of my invention provides an auxiliary starter for the motor in the absence of the usual starting equipment of the vehicle, as for instance when a battery is unable to operate the usual starter, and for emergency use in a shop, or garage, when replacements or repairs are being made, as well as for starting a "cold" motor of an automobile.

The quick detachable appliance of my invention includes a minimum number of parts that may with facility be manufactured with low cost of production, and the parts may be assembled with convenience, to provide a durable and efficient means for starting a motor, and which may be manipulated with a minimum expenditure of time and labor.

The invention consists in certain novel features of construction and combinations and arrangements of parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of my invention. It will however be understood that changes and alterations may be contemplated and may be made in these exemplifying drawings and mechanical structures within the scope of my claims, without departing from the principles of the invention.

Figure 1 is a view in side elevation showing a vehicle wheel equipped with the appliance of my invention; and Figure 2 is an edge view as seen from the right in Fig. 1.

Figure 3 is a vertical sectional view as at line 3—3 of Fig. 2.

Figure 4 is an enlarged detail transverse sectional view at the central portion of the appliance.

Figure 5 is a view in side elevation showing an automobile jacked up, with an appliance of my invention mounted on one of the drive wheels, and a pull rope attached to the lever mechanism for turning over the wheel.

Figure 6 is a detail view in elevation showing a modified form of pawl and ratchet mechanism; and Figure 7 is a sectional detail view at line 7—7 of Fig. 6.

In order that the general relation and utility of parts may readily be understood I have shown in Fig. 5 a conventional automobile including a wheel W and its tire T, one of the rear fenders F and bumper B; and the rear end of the vehicle is elevated by means of a jack J in order that the wheel may be turned, as by means of a pull on the rope R that is attached to the lever mechanism of the appliance and anchored at its front end to a supporting part of the vehicle.

The quick detachable appliance of my invention, which may with ease be mounted upon the wheel W and its tire T, includes a preferably circular base plate 1 that is equipped with a pair of diametrically arranged radial arms 2 and 3, and these arms are provided with extensions 4 and 5 that are retained and guided by means of cross straps 6, 6, bolted to the arms 2 and 3.

For mounting the appliance on the wheel and its tire I employ two or more, opposed, Y-shaped yokes 7 and 8 that terminate in hooks adapted to fit over the tire T, and these yokes are provided with attaching blades 9 that are adjustable on the arms 4 and 5, in order to adapt the yokes for mounting on wheel tires of varying sizes. For this adjustment the extensions 4 and 5 are each provided with a series of spaced bolt holes 10, and bolts 11, 11, are passed through selected holes in the blades and arms to securely retain the yokes in adjusted position on the tires.

By means of a pair of winged set bolts 12, 12 mounted in cross straps 6, 6, the extensions 4 and 5 are rigidly united with the arms 2 and 3, and the extension arms are thus held rigidly with the base plate which is rigidly suspended by the yokes at the outer side of the vehicle wheel.

Before the bolts 12, 12 are turned to set the arms and yokes, the yokes with their hooks over the tire are drawn inwardly to position of Fig. 3 to clamp the appliance on the wheel or its tire.

For this purpose the base plate is equipped with an integral stud axle or pin 13 upon which a disk 14 is loosely mounted to turn, and as shown this disk is provided with a pair of opposed eccentric or cam grooves or slots 15 and 16 into which bolts 17 project. The bolts 17 are mounted in the inner ends of the extensions 4 and 5, and it will be apparent that as the disk is turned clockwise, as in Fig. 3, the yokes are drawn inwardly and clamped on the tire; when the disk is turned counterclockwise, the yokes are projected outwardly and radially, and thus released from the tires.

The retracted yokes are held in rigid position by the set bolts 12, 12, and of course these bolts are released in order to project the yokes for releasing them from the tire.

For operating the cam disk a hand lever 18 is mounted by its hub 19 for oscillating movement on the axle 13, and this lever is equipped with a quick detachable handle 20 that is fastened by bolts 21 on the free end of the lever. In cooperation with the oscillating movement of the lever in tightening the yokes on the wheel tire, I employ a ratchet wheel 22 secured as by a set bolt 23 on the axle 13, and a pawl or detent 24 is pivotally mounted on the lever and pressed by spring 25 into engagement with the ratchet teeth.

This operation of rigidly mounting the yokes on the wheel tire may be accomplished by means of the detached handle 20, after bolts 21 have been removed, and the handle is equipped with an end lug or tongue 27 that is adapted to fit into a complementary socket 28 in the outer periphery of the disk 14 as best seen in Fig. 3.

From this description taken in connection with the drawings it will be apparent that the rigidly mounted appliance may be manually operated by grasping the handle 20, and a quick swing of the lever turns over the wheel for starting the motor as previously described, after which the appliance may with facility be released and removed from the wheel of the vehicle.

In Fig. 5 the rope R, which is attached to a lever 29 that is anchored by a spring 30 to the bumper B, may be given a quick pull to turn the vehicle wheel after which the wheel is returned to initial position by the retracting spring 30. In Figs. 6 and 7 the lever 32 is connected by a U-bend with the hub 14 and the ratchet pawl 34 is journaled in this bend and pressed by spring 35 into engagement with the ratchet wheel 22.

Having thus fully described my invention what I claim as new and desire to secure by Letters Patent is:

1. In a manually operable device for rotating a wheel, the combination with a central base plate having a centrally located outwardly extending shaft integral therewith, a pair of diametrically arranged arms mounted on said base plate, and an extension adjustably connected to each of said arms, and a yoke mounted on each of said extensions for clamping a wheel tire, of a rotary cam disc having opposed eccentric slots and mounted on the shaft on said base plate, a bearing pin on each of said extensions coacting with the walls of said slots, a socket in the periphery of said disc, a handle having an end complementary to the shape of the socket and receivable therein for turning the cam disc for rigidly mounting the yokes on the wheel tire, a hand lever having a hub rotatably mounted on said shaft, a ratchet fixed to the end of the shaft outwardly of the hub and a quick detachable means mounted on said hand lever and engaging said ratchet for rotating the wheel.

2. In a wheel rotating device, a circular base plate, a pair of diametrically arranged arms projecting from said base plate, a pair of extensions, means for adjustably connecting one of said pair of extensions to each of said arms, said means comprising cross straps on each of said arms about each of said extensions, and winged set bolts in one of said arms and engaging said extensions for maintaining said extensions immobile in their adjusted positions, a plurality of yokes each having an end terminating in a hook and their other ends terminating in blades, means for adjustably connecting the said blades to said extension comprising a plurality of spaced holes arranged in said extensions and said blades, securing bolts selectively extending through certain of said holes in said blades and through certain of said holes in said extension for maintaining the blades and extensions immobile in their adjusted positions.

JOHN SCHAEFER.

REFERENCES CITED

The following references are of record in the file of this patent:

UNITED STATES PATENTS

| Number | Name | Date |
|---|---|---|
| 873,764 | Manz | Dec. 17, 1907 |
| 1,568,801 | Cowdrey | Jan. 5, 1926 |
| 1,705,582 | May | Mar. 19, 1929 |
| 1,979,032 | Galloway | Oct. 30, 1934 |
| 2,030,914 | Evans | Feb. 18, 1936 |